(12) United States Patent
Tsuritani

(10) Patent No.: US 12,330,594 B2
(45) Date of Patent: Jun. 17, 2025

(54) ITEM FIXTURE, HANDLE, METHOD OF ATTACHING MEASURING APPARATUS TO VEHICLE, AND MOBILE MEASURING APPARATUS

(71) Applicant: Shoh Tsuritani, Tokyo (JP)

(72) Inventor: Shoh Tsuritani, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 18/341,144

(22) Filed: Jun. 26, 2023

(65) Prior Publication Data

US 2024/0010134 A1 Jan. 11, 2024

(30) Foreign Application Priority Data

Jul. 11, 2022 (JP) .................................. 2022-111278

(51) Int. Cl.
| | |
|---|---|
| *B60R 9/058* | (2006.01) |
| *B60R 11/04* | (2006.01) |
| *H04N 23/54* | (2023.01) |
| *B60R 11/00* | (2006.01) |
| *E01C 23/01* | (2006.01) |

(52) U.S. Cl.
CPC .............. *B60R 9/058* (2013.01); *B60R 11/04* (2013.01); *H04N 23/54* (2023.01); *B60R 2011/004* (2013.01); *B60R 2011/0066* (2013.01); *B60R 2011/0085* (2013.01); *E01C 23/01* (2013.01)

(58) Field of Classification Search
CPC ... B60R 9/058; B60R 11/04; B60R 2011/004; B60R 2011/0066; B60R 2011/0085; E01C 23/01; H04N 23/54; F16M 11/00
See application file for complete search history.

(56) References Cited

U.S. PATENT DOCUMENTS

| | | | | |
|---|---|---|---|---|
| 5,835,808 | A | * 11/1998 | Parker ..................... | B60R 11/04 396/419 |
| 6,040,853 | A | *  3/2000 | Delagnes ............ | G01N 21/8903 73/104 |
| 8,831,415 | B2 | *  9/2014 | Greenthal ............ | H04N 23/695 396/419 |
| 10,479,288 | B2 | * 11/2019 | Nelson ................... | F16M 11/16 |

(Continued)

FOREIGN PATENT DOCUMENTS

| | | |
|---|---|---|
| JP | 2018-154325 | 10/2018 |
| JP | 2020-027086 | 2/2020 |

(Continued)

*Primary Examiner* — Monica E Millner
(74) *Attorney, Agent, or Firm* — IPUSA, PLLC

(57) ABSTRACT

An item fixture, a handle, a method of attaching a measuring apparatus to a vehicle, and a mobile measuring apparatus. The item fixture includes a fixation member to be attached to an attachment portion of a vehicle, and a handle attachment portion to which a handle used to attach the item fixture to the vehicle is to be detachably attached. The method of attaching a measuring apparatus to the vehicle includes attaching a pair of handles to an item fixture of the measuring apparatus, attaching the item fixture to an attachment portion of the vehicle, using the pair of handles as a handle of the item fixture, and detaching the pair of handles from the item fixture. The mobile measuring apparatus includes the vehicle, the item fixture attached to the vehicle, and a measuring device attached to the item fixture.

8 Claims, 14 Drawing Sheets

(56) References Cited

U.S. PATENT DOCUMENTS

| | | | |
|---|---|---|---|
| 10,543,783 B1* | 1/2020 | Wang | H04N 23/695 |
| 10,800,346 B2* | 10/2020 | Taylor | B60J 10/90 |
| 11,117,528 B2* | 9/2021 | Okuda | B60R 11/04 |
| 11,265,485 B2* | 3/2022 | Tsuritani | H04N 23/90 |
| 11,465,568 B2* | 10/2022 | Skinner | B60R 11/04 |
| 11,760,274 B2* | 9/2023 | Higashimachi | B60R 11/04 |
| | | | 248/237 |
| 2012/0138763 A1* | 6/2012 | Russell | F16M 11/242 |
| | | | 29/428 |
| 2018/0001836 A1* | 1/2018 | Pan | H04N 23/51 |
| 2018/0037172 A1* | 2/2018 | Nelson | F16M 11/2092 |
| 2019/0351840 A1* | 11/2019 | Kasarla | B60R 11/04 |
| 2020/0156559 A1* | 5/2020 | Shiratsuki | F16M 13/022 |
| 2020/0274223 A1* | 8/2020 | Jang | F16M 11/10 |
| 2023/0185172 A1 | 6/2023 | Tsuritani | |

FOREIGN PATENT DOCUMENTS

| | | |
|---|---|---|
| JP | 2020-038171 | 3/2020 |
| JP | 2022-027506 | 2/2022 |

* cited by examiner

FIG. 17
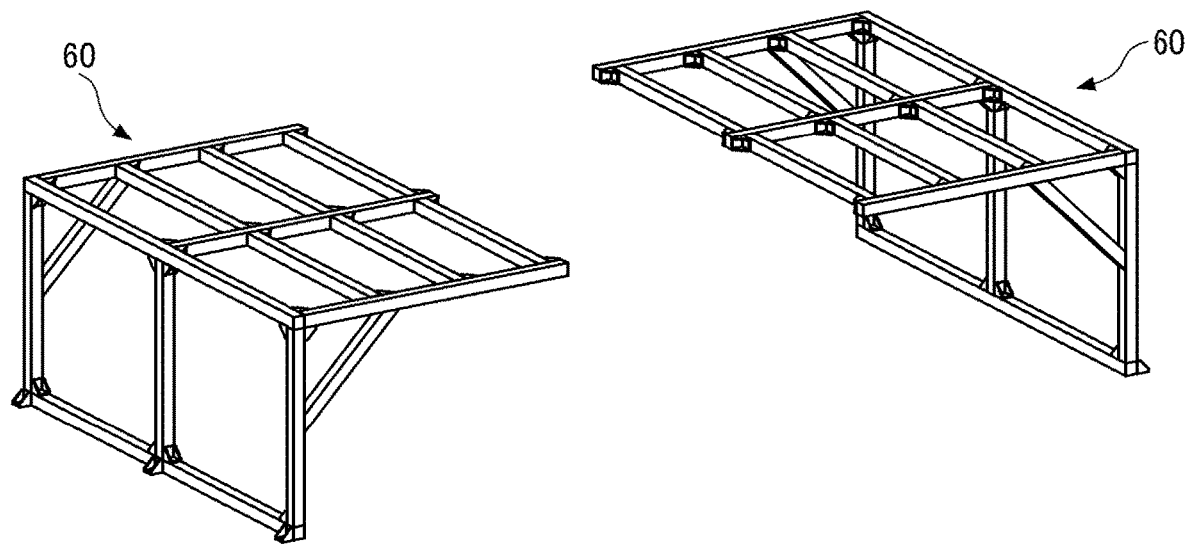
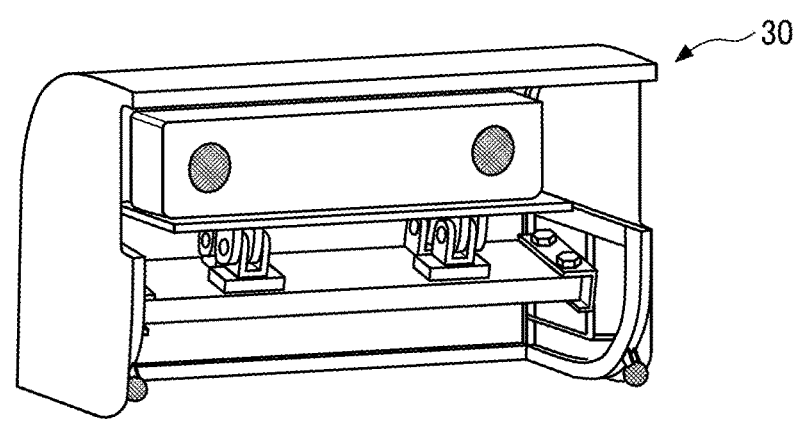
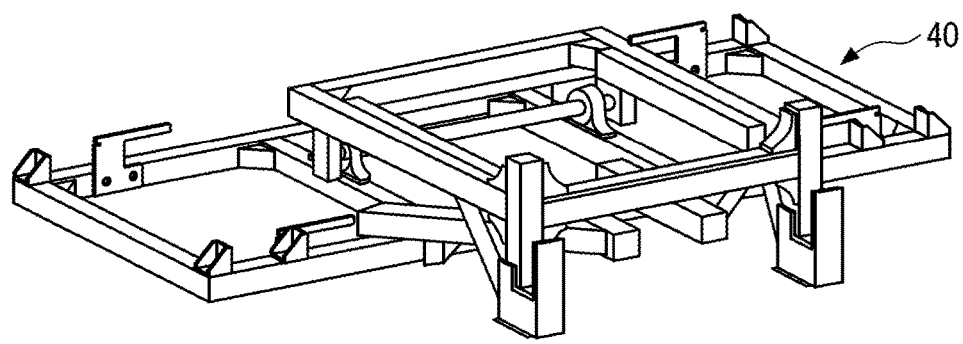

ITEM FIXTURE, HANDLE, METHOD OF ATTACHING MEASURING APPARATUS TO VEHICLE, AND MOBILE MEASURING APPARATUS

CROSS-REFERENCE TO RELATED APPLICATION

This patent application is based on and claims priority pursuant to 35 U.S.C. § 119(a) to Japanese Patent Application No. 2022-111278, filed on Jul. 11, 2022, in the Japan Patent Office, the entire disclosure of which is hereby incorporated by reference herein.

BACKGROUND

Technical Field

Embodiments of the present disclosure relate to an item fixture, a handle, a method of attaching a measuring apparatus to a vehicle, and a mobile measuring apparatus.

Background Art

Mobile objects are known in the art in which an imaging device such as a stereo camera is attached to a vehicle to measure external environments such as vehicles around its own vehicle, road conditions, and tunnel condition. For example, a camera having a wide-angle lens, a plurality of cameras such as stereo cameras, and a light detection and ranging (LiDAR) device are known in the art as an imaging device used to measure external environments.

For example, a measuring device that is mounted on a vehicle to measure the road height is known in the art. Such a measuring device is mounted on a vehicle and uses a light section method to measure the heights of a plurality of portions of the road surface on which the vehicle travels.

SUMMARY

Embodiments of the present disclosure described herein provide an item fixture, a handle, a method of attaching a measuring apparatus to a vehicle, and a mobile measuring apparatus. The item fixture includes a fixation member to be attached to an attachment portion of a vehicle, and a handle attachment portion to which a handle used to attach the item fixture to the vehicle is to be detachably attached. The method of attaching a measuring apparatus to the vehicle includes attaching a pair of handles to an item fixture of the measuring apparatus, attaching the item fixture to an attachment portion of the vehicle, using the pair of handles as a handle of the item fixture, and detaching the pair of handles from the item fixture. The mobile measuring apparatus includes the vehicle, the item fixture attached to the vehicle, and a measuring device attached to the item fixture.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 17 is a perspective view of a measuring device, an item fixture, and a pair of handles that are detached from a vehicle, according to an embodiment of the present disclosure.

Figure 1:
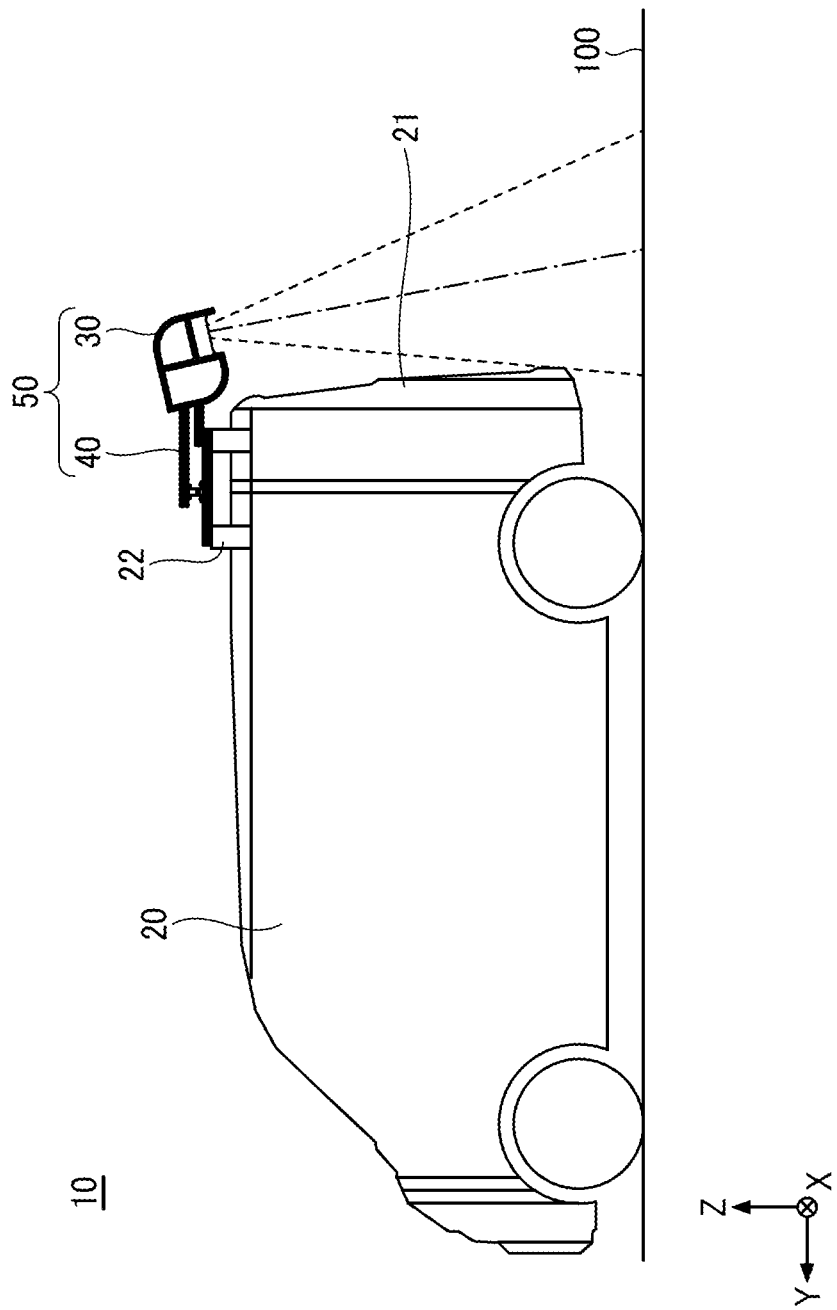
FIG. 1 is a side view of a mobile measuring apparatus provided with a measuring apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the drawings. Note that like reference signs are given to elements similar to those described in the first embodiment, and their detailed description is omitted.

FIG. 1 is a side view of a mobile measuring apparatus 10 provided with a measuring apparatus 50, according to an embodiment of the present disclosure.

In the following description, a direction of travel of the vehicle 20 is referred to as a forward direction, and the reverse direction of the forward direction is referred to as a backward direction or a reversing direction. The direction of gravity is referred to as a downward direction, and the reverse direction of the downward direction is referred to as an upward direction. A horizontally right direction in view of direction of travel is referred to as a right direction, and the reverse direction of the right direction is referred to as a left direction. The image-capturing direction of the measuring device 30 is indicated by a chain line, and the capturing range of the measuring device 30 is indicated by a broken line.

The mobile measuring apparatus 10 according to the present embodiment measures the state of a road surface 100 while traveling on the road surface 100. The mobile measuring apparatus 10 includes a vehicle 20 and a measuring apparatus 50 attached to the vehicle 20. The measurement apparatus 50 includes a measuring device 30 provided with a stereo camera 31 that serves as an imaging device as will be described later in detail with reference to FIG. 2, and an item fixture 40 that attaches an item, i.e., the measuring device 30, to the vehicle 20.

The vehicle 20 according to the present embodiment is, for example, an automobile and a car used for a railway. In the following description, the vehicle 20 refers to an automobile. The vehicle 20 can travel or move on the road surface 100. The vehicle 20 is provided with an attachment portion 22 on its top face, which is the roof of the room of the vehicle. The item fixture 40 is installed on the attachment portion 22. The vehicle 20 is provided with a rear hatch 21 that can be opened and closed at the rear of the vehicle 20. The rear side of the vehicle 20 is different from the top face of the vehicle 20.

The item fixture 40 according to the present embodiment is attached to the attachment portion 22 from the top face to the rear of the vehicle 20. The measuring device 30 is attached to the item fixture 40 such that the image-capturing direction is substantially downward. The measuring device 30 may be attached to the movable range of the rear hatch 21 while measurement is to be performed.

Due to such a configuration as described above, the mobile measuring apparatus 10 according to the present embodiment can capture an image of the road surface 100 with the stereo camera 31 of the measuring device 30, as will be described later in detail with reference to FIG. 2, while traveling forward on the road surface 100. By so doing, the unevenness of the road surface 100, which is an object to be measured, or the road conditions can be measured. The road conditions relate to, for example, whether some of the white lines on the road has worn out. More specifically, road-condition values such as the flatness or evenness of the road, the unevenness in the directions of travel, rutting depth, and a cracking ratio can be measured. Afterward, a maintenance control index (MCI) can be obtained based on these three or four road-condition values. The MCI may be obtained after the measurement upon sending the measurement data to an external device such as a personal computer (PC) or a tablet PC. Alternatively, the MCI may be obtained while the vehicle 20 is traveling and performing measurement, upon installing a PC on the vehicle 20.

In the following description, it is assumed that the item fixture 40 is attached to the top face of the vehicle, which is the roof of the room of the vehicle 20. The position where the item fixture 40 is attached is not limited to the position as described above. For example, the item fixture 40 may be attached to a load platform of the room of the vehicle arranged at the rear.

In the following description, it is assumed that the mobile measuring apparatus 10 according to the present embodiment inspects the road surface 100. However, no limitation is indicated thereby, and the mobile measuring apparatus 10 according to the present embodiment may be applied to other kinds of structure or configuration that inspects, for example, the side wall of the road surface 100, and the inner wall of a tunnel including side walls of a tunnel and a ceiling of a tunnel.

The measuring device 30 according to the present embodiment is described below in further detail.

Figure 2:
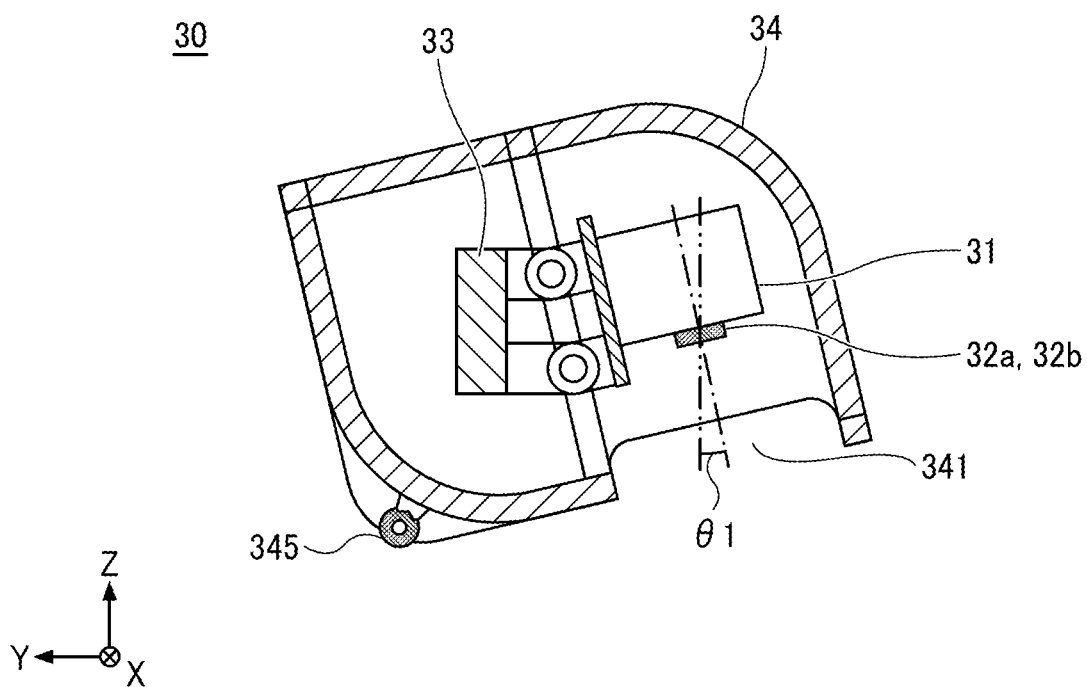
FIG. 2 is a lateral sectional view of a measuring device according to an embodiment of the present disclosure.

FIG. 2 is a lateral sectional view of the measuring device 30 according to the present embodiment.

Figure 3:
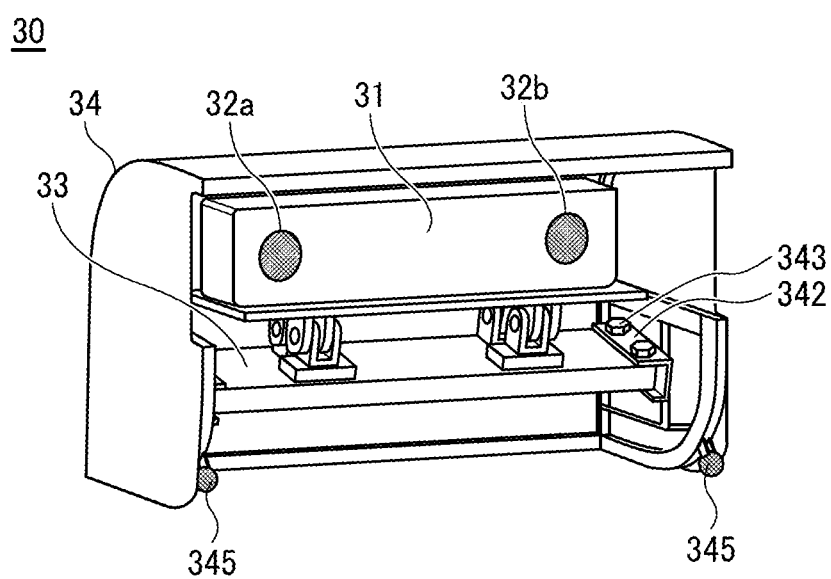
FIG. 3 is a perspective bottom view of a measuring device according to an embodiment of the present disclosure.

FIG. 3 is a perspective bottom view of the measuring device 30 according to the present embodiment.

The measuring device 30 according to the present embodiment is provided with a stereo camera 31 that includes a pair of lenses 32a and 32b and serves as an imaging device, a camera mount 33 that serves as an imaging-device holding part onto which the stereo camera 31 is fixed, and a protector 34 that covers the stereo camera 31.

The stereo camera 31 is a camera provided with a pair of lenses 32a and 32b, and can measure the distance to an object to be measured by processing the obtained image data. In the description given below, it is assumed that the imaging device provided for the measuring device 30 is the stereo camera 31. However, no limitation is indicated thereby. For example, when it is desired that the conditions of an object be checked, a camera provided with a monocular lens may be used as the imaging device. The number of imaging devices provided for the measuring device 30 is not limited to one, and may be two or more. By arranging a plurality of imaging devices, measurement data can be acquired over a wider range. By adopting wide-angle lenses with a focal distance equal to or shorter than 35 mm as the lenses 32a and 32b of the stereo camera 31, measurement data can be acquired over an even wider range. The imaging device of the measuring device 30 is not limited to the stereo camera 31, and may be, for example, a monocular camera, a wide-angle camera, and a light detection and ranging (LiDAR) device.

The stereo camera 31 according to the present embodiment is fixed to the camera mount 33. The stereo camera 31 is attached to the item fixture 40 (see, for example, FIG. 1) through the camera mount 33. The camera mount 33 according to the present embodiment may have an angle adjustment function to adjust the angle of the stereo camera 31.

As illustrated in FIG. 2, the image-capturing direction of the stereo camera 31 of the measuring device 30 has a predetermined angle with respect to the direction of travel of the vehicle 20 (see, for example, FIG. 1). In other words, when the measuring device 30 is viewed from the width direction or lateral direction, the image-capturing direction of the stereo camera 31 that is indicated by a dot-and-dash line is inclined at a predetermined angle $\theta_1$ in the reverse direction of the direction of travel of the vehicle 20 with respect to the vertical direction or the up and down direction indicated by a dot-dot-dash line.

The protector 34 according to the present embodiment is made of, for example, a resin frame and an aluminum (Al) frame that supports the resin plate, and is a box-shaped component that has an opening 341 on the bottom in the image-capturing direction of the imaging device. The stereo camera 31 according to the present embodiment is arranged in the internal space of the protector 34. The light that is emitted from a light source such as the sun or a street lamp serves as disturbance light, and the protector 34 according to the present embodiment prevents the disturbance light from entering the pair of lenses 32a and 32b directly. For example, the protector 34 protects the stereo camera 31 from rain and wind.

As illustrated in FIG. 3, a bracket 342 is arranged inside the protector 34. The bracket 342 is fixed to the camera mount 33 using a fastening member 343 such as a bolt. Due to such a configuration, the camera mount 33 can be fixed to the protector 34 through the opening 341 of the protector 34.

The protector 34 of the measuring device 30 that is attached to the item fixture 40 is provided with a contact portion 345 that contacts the rear hatch 21 when the rear hatch 21 is opened. Preferably, the contact portion 345 according to the present embodiment is composed of, for example, a rotatable roller or a member with good slidability such as a polyoxymethylene (POM) resin and a polyamide resin.

The measuring device 30 and the item fixture 40 are described below in further detail with reference to FIG. 4, FIG. 5, and FIG. 6.

Figure 4:
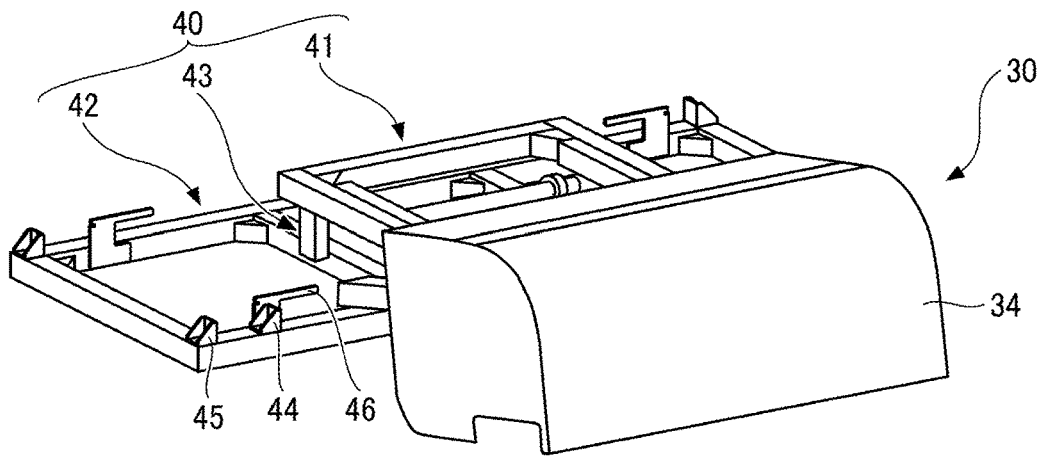
FIG. 4 is a perspective view of a measuring device and an item fixture, according to an embodiment of the present disclosure.

FIG. 4 is a perspective view of the measuring device 30 and the item fixture 40, according to the present embodiment.

Figure 5:
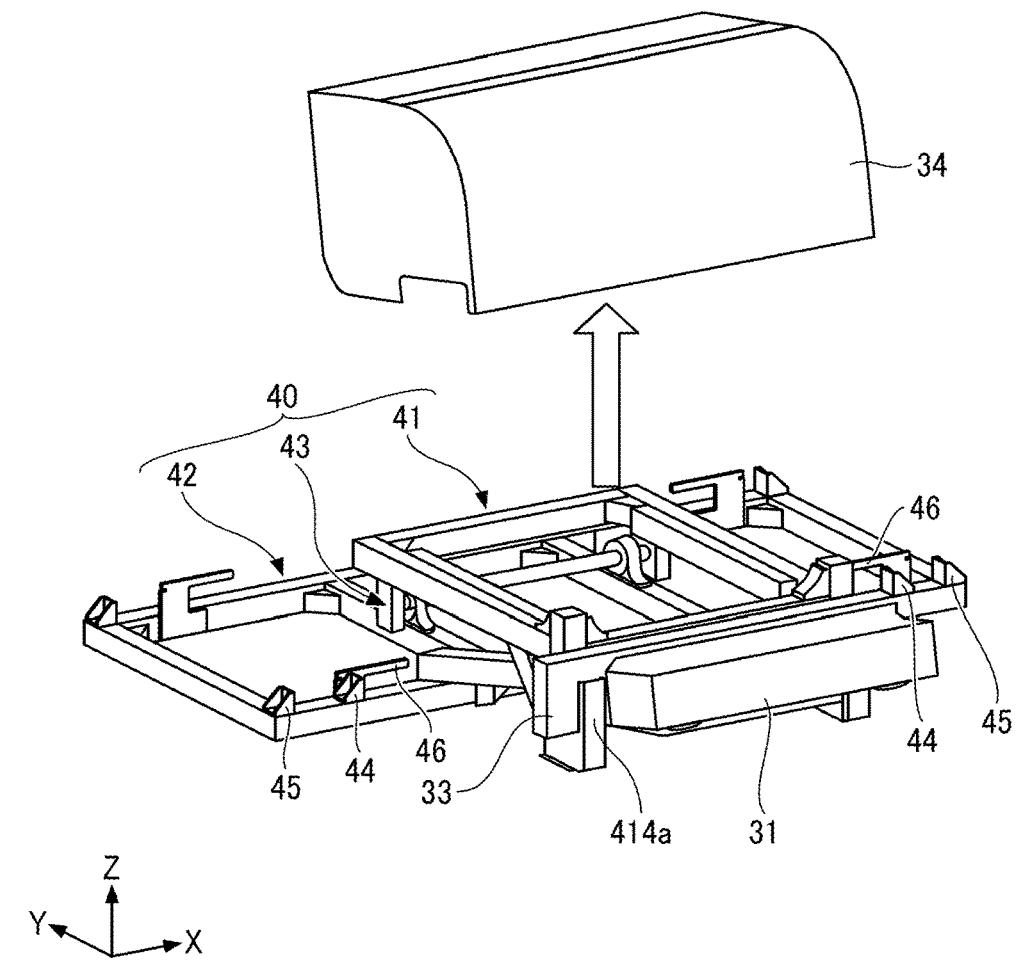
FIG. 5 is a perspective view of a measuring device and an item fixture from which a protector is detached, according to an embodiment of the present disclosure.

FIG. 5 is a perspective view of the measuring device 30 and the item fixture 40 from which the protector 34 is detached, according to the present embodiment.

Figure 6:
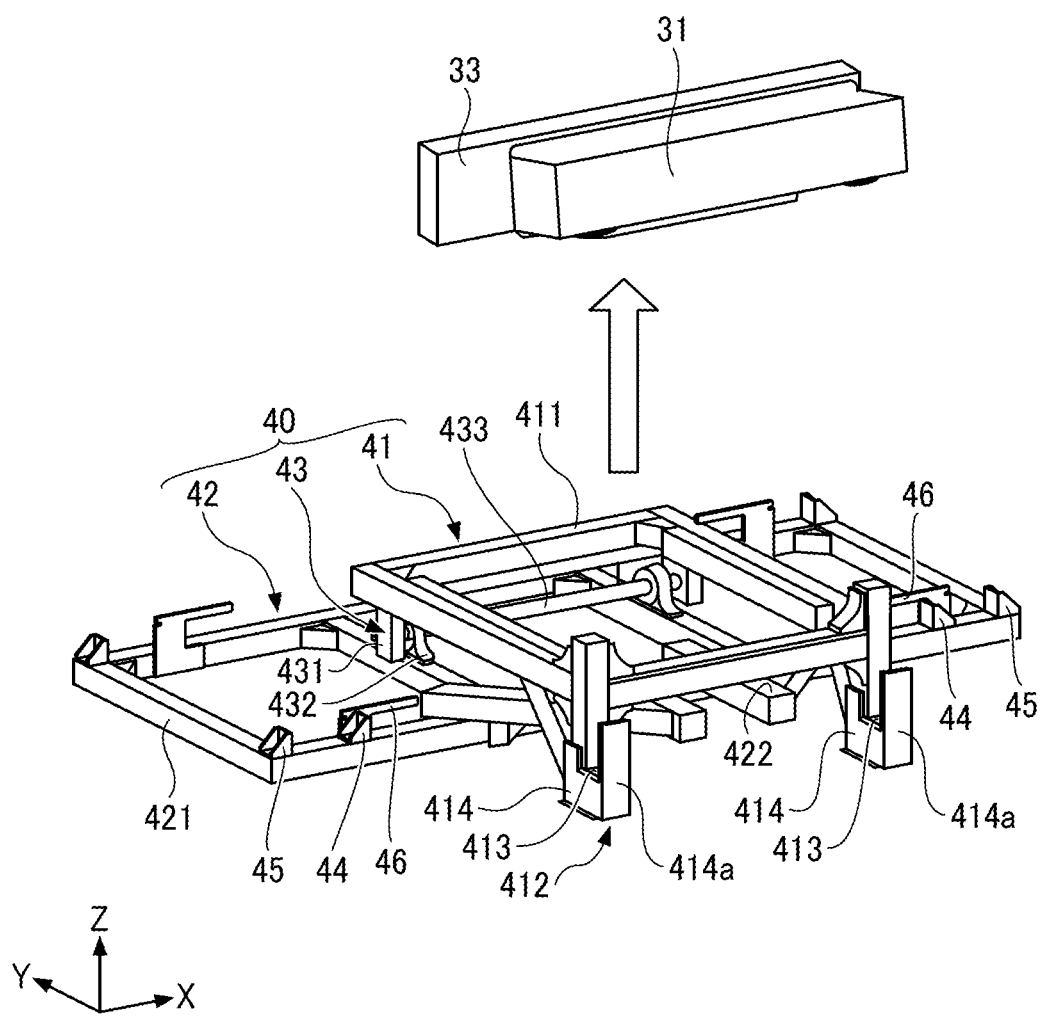
FIG. 6 is a perspective view of a measuring device and an item fixture from which a stereo camera and a camera mount are detached, according to an embodiment of the present disclosure.

FIG. 6 is a perspective view of the measuring device 30 and the item fixture 40 from which the stereo camera 31 and the camera mount 33 are detached, according to the present embodiment.

In the following description, it is assumed that the width direction of the item fixture 40, which may be referred to as the X-axis direction in the following description, is equivalent to the width direction of the vehicle 20 parallel to the right and left direction when the item fixture 40 is installed on the vehicle 20. Moreover, it is assumed in the following description that the forward and backward direction of the item fixture 40, which may be referred to as the Y-axis direction in the following description, is equivalent to the forward and backward direction of the vehicle 20 when the item fixture 40 is installed on the vehicle 20. Further, it is assumed in the following description that the height direction of the item fixture 40, which may be referred to as the Z-axis direction in the following description, is equivalent to the height direction of the vehicle 20 parallel to the up and down direction when the item fixture 40 is installed on the vehicle 20.

The item fixture 40 according to the present embodiment is provided with a holding member 41 that can hold the measuring device 30 or the camera mount 33, a fixation member 42 attached to the attachment portion 22 of the vehicle 20 (see, for example, FIG. 1), and a rotator 43 that supports the holding member 41 in a rotatable manner around the fixation member 42.

The holding member 41 according to the present embodiment is provided with a frame 411, and a pair of holders 412 fixed to a rear portion of the frame 411. The pair of holders 412 according to the present embodiment hold the stereo camera 31 and the camera mount 33.

Each one of the pair of holders 412 according to the present embodiment includes a bracket 413 and a fall prevention part 414. The bracket 413 is fixed to the holder 412. The camera mount 33 according to the present embodiment is fixed to the bracket 413 from below the camera mount 33 using a fastening member such as a bolt. Due to such a configuration, the camera mount 33 can be fixed to the protector 34 through the opening 341 of the protector 34.

The fall prevention part 414 includes a bearing portion 414a. Due to such a configuration, the stereo camera 31 and the camera mount 33 can be prevented from falling toward the rear by its own weight of the stereo camera 31. When the camera mount 33 is fixed to the bracket 413 by using a fastening member, the camera mount 33 is supported by the fall prevention part 414. Due to such a configuration, the degree of processability when the camera mount 33 is attached to or detached from the holding member 41 can be increased.

The fixation member 42 according to the present embodiment is provided with a frame 421 and a locking portion 422 that contacts the holding member 41 or the frame 411.

The rotator 43 according to the present embodiment includes a bearing 431 fixed to the frame 411, a bearing 432 fixed to the frame 421, and a shaft 433 inserted into the bearing 431 and the bearing 432. Due to such a configuration, the holding member 41 is rotatably supported around the shaft 433 that serves as a rotation axis. The bearing 432 is arranged ahead of the center of the frame 421 in the front-rear direction parallel to the Y-axis direction. Due to such a configuration, a sufficient degree of radius of gyration or a sufficient distance between the holder 412 and the shaft 433 that serves as the rotation axis is left, and a sufficient amount of moving distance of the holder 412 to allow the holding member 41 to rotate can be achieved.

Rotation of the holding member 41 is locked by the locking portion 422 of the fixation member 42.

When the rear hatch 21 is closed, clockwise turning moment is applied to the holding member 41 that can rotate around the shaft 433 that serves as a rotation axis, by its own weight of the measuring device 30. Accordingly, the holding member 41 is locked by the locking portion 422 of the fixation member 42, and the rotation of the holding member 41 is locked. Due to such a configuration, for example, the road surface 100 can be inspected using the measuring device 30.

The item fixture 40 according to the present embodiment may be provided with a rotation stopper that stops the rotation of the holding member 41 at a position where the holding member 41 is locked by the locking portion 422. The rotation stopper according to the present embodiment may be, for example, a fastening member such as a bolt that fixes the holding member 41 and the locking portion 422. Accordingly, the holding member 41 can be prevented from swinging when the vehicle 20 is traveling. The holding member 41 can be swung or oscillated by releasing the fixation by the rotation stopper.

When the rear hatch 21 according to the present embodiment is opened, the rear hatch 21 contacts the contact portion 345 of the protector 34 of the measuring device 30. When the rear hatch 21 is further opened, the contact portion 345 receives the load or pressure from the rear hatch 21, and the holding member 41 and the measuring device 30 can rotate around the shaft 433 that serves as a rotation axis. Accordingly, the rear hatch 21 can be easily opened and closed in the mobile measuring apparatus 10 where the measuring device 30 is attached to the vehicle 20 using the item fixture 40, and the degree of customer convenience can be increased.

As illustrated in FIG. 5, the fixation between the bracket 342 and the camera mount 33 using the fastening member 343 (see, for example, FIG. 3) can be released. By so doing, the protector 34 can be removed from the camera mount 33. Due to such configurations as described above, the degree of processability when the coupling of the stereo camera 31 is established using a harness can be increased.

As illustrated in FIG. 6, the fixation between the bracket 413 and the camera mount 33 using the fastening member can be released. By so doing, the camera mount 33 and the stereo camera 31 can be removed from the item fixture 40.

When the protector 34 is attached to the camera mount 33, the fixation between the bracket 413 and the camera mount 33 using the fastening member can be released. By so doing, as will be described later in detail with reference to FIG. 17, the measuring device 30 can be removed from the item fixture 40.

In other words, the stereo camera 31, the camera mount 33, and the protector 34 can be detached from the item fixture 40 at a time. Due to such a configuration, when the stereo camera 31 is not to be used for capturing images, the measuring device 30 can be removed from the item fixture 40 and can be stored in the room of the vehicle 20.

The item fixture 40 according to the present embodiment has a pair of handle attachment portions 44, a plurality of handle attachment portions 45, and a pair of rotation restraints 46 on both sides in the width direction parallel to the X-axis direction. The pair of handle attachment portions 44, the multiple handle attachment portions 45, and the pair of rotation restraints 46 are arranged on the top face of the fixation member 42 or the frame 421. The pair of handle attachment portions 44 and 45 and the rotation restraint 46 together configure a structure to which a handle 60 described later is attached as will be described later in detail.

The structure of how the pair of handles 60 are attached to the item fixture 40 is described below with reference to FIG. 7, FIG. 8, FIG. 9, FIG. 10, and FIG. 11.

Figure 7:
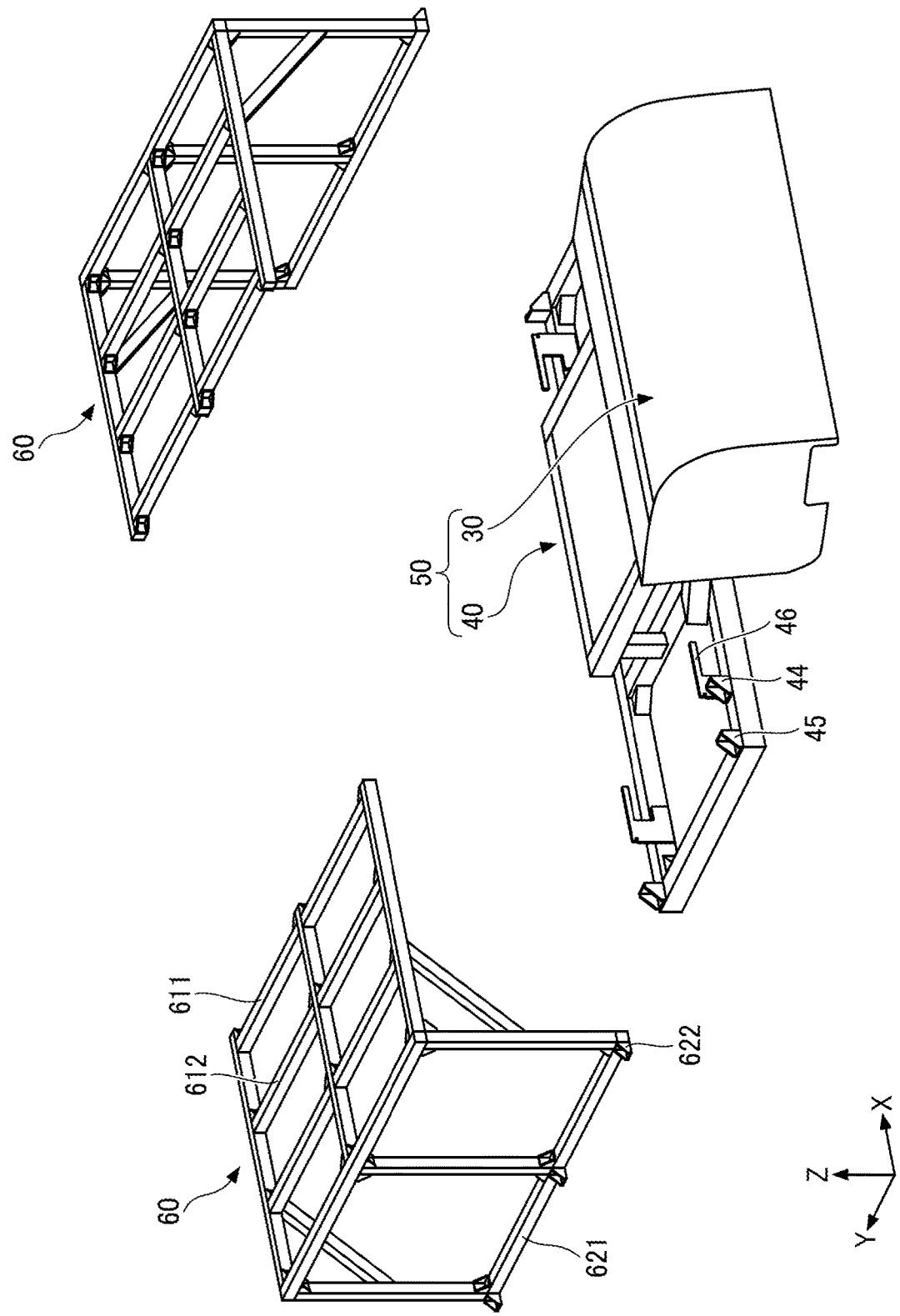
FIG. 7 is a perspective view of a measuring apparatus and a pair of handles, according to an embodiment of the present disclosure.

FIG. 7 is a perspective view of the measuring apparatus 50 and the pair of handles 60, according to the present embodiment.

Figure 8:
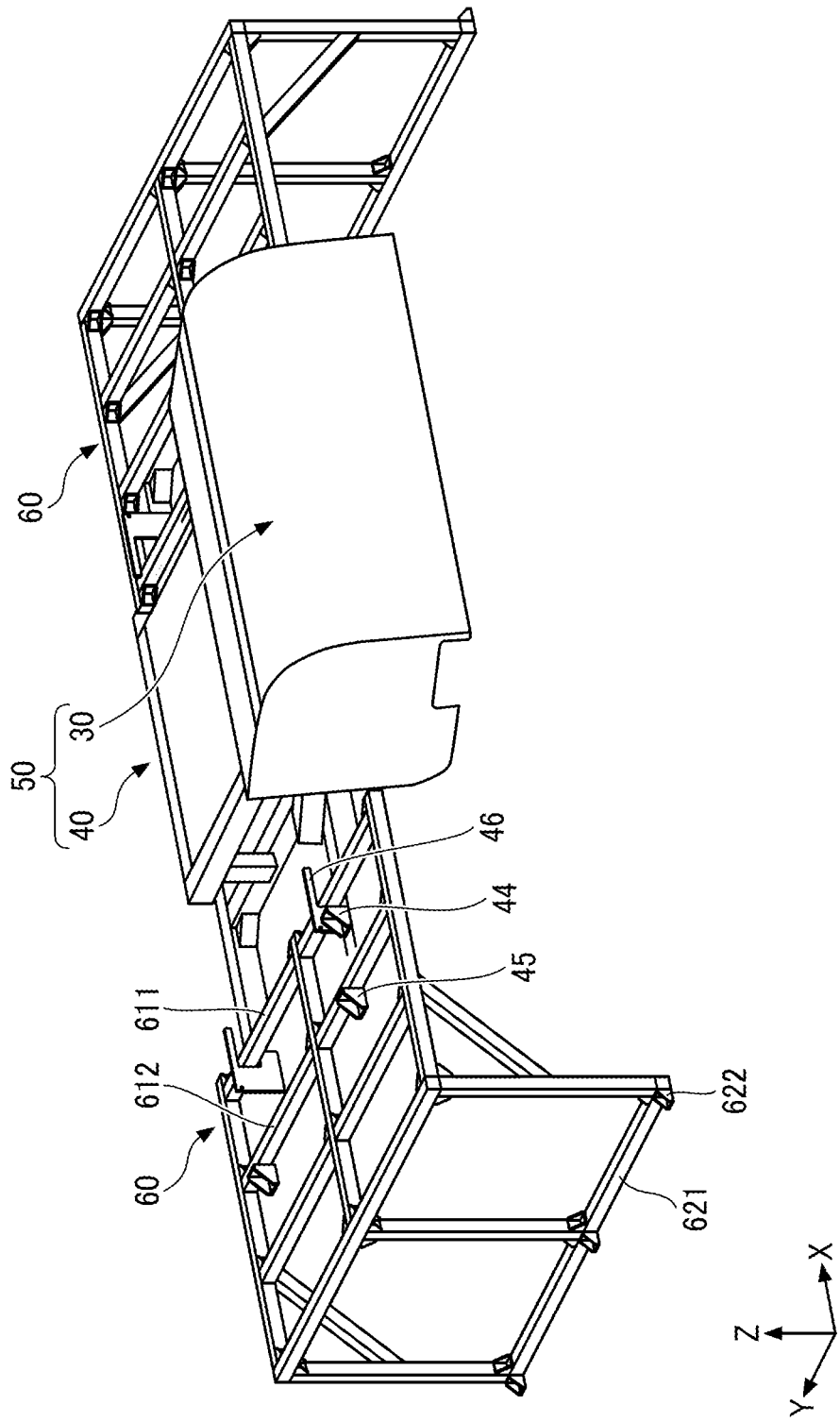
FIG. 8 is a perspective view of a measuring apparatus to which a pair of handles are attached, according to an embodiment of the present disclosure.

FIG. 8 is a perspective view of the measuring apparatus 50 to which the pair of handles 60 are attached, according to the present embodiment.

Figure 9:
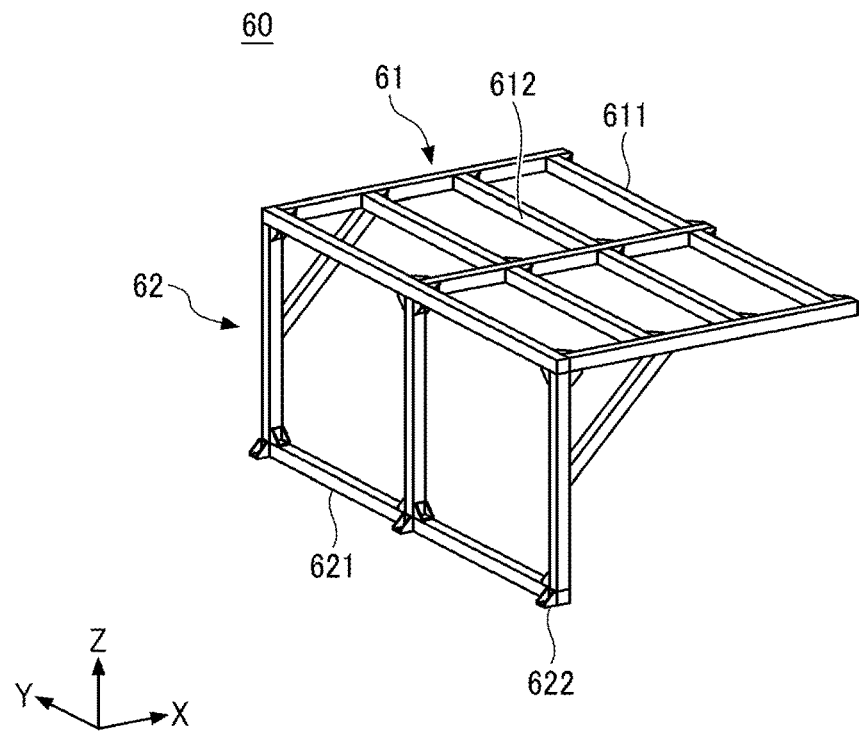
FIG. 9 is a perspective view of one of a pair of handles according to an embodiment of the present disclosure.

FIG. 9 is a perspective view of one of the pair of handles 60 according to the present embodiment.

Figure 10:
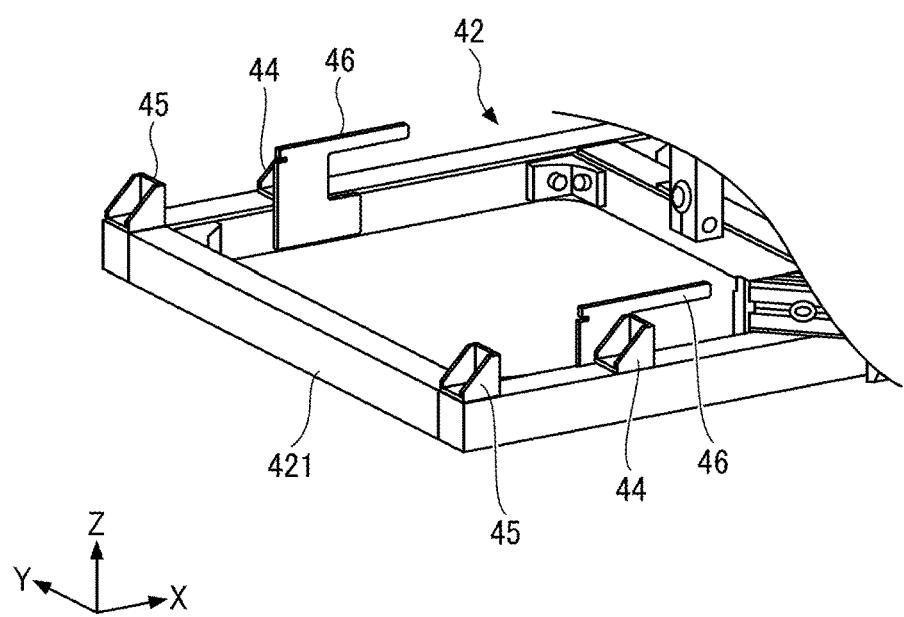
FIG. 10 is a magnified partial perspective view of an item fixture provided for a measuring apparatus, according to an embodiment of the present disclosure.

FIG. 10 is a magnified partial perspective view of the item fixture 40 provided for the measuring apparatus 50, according to the present embodiment.

Figure 11:
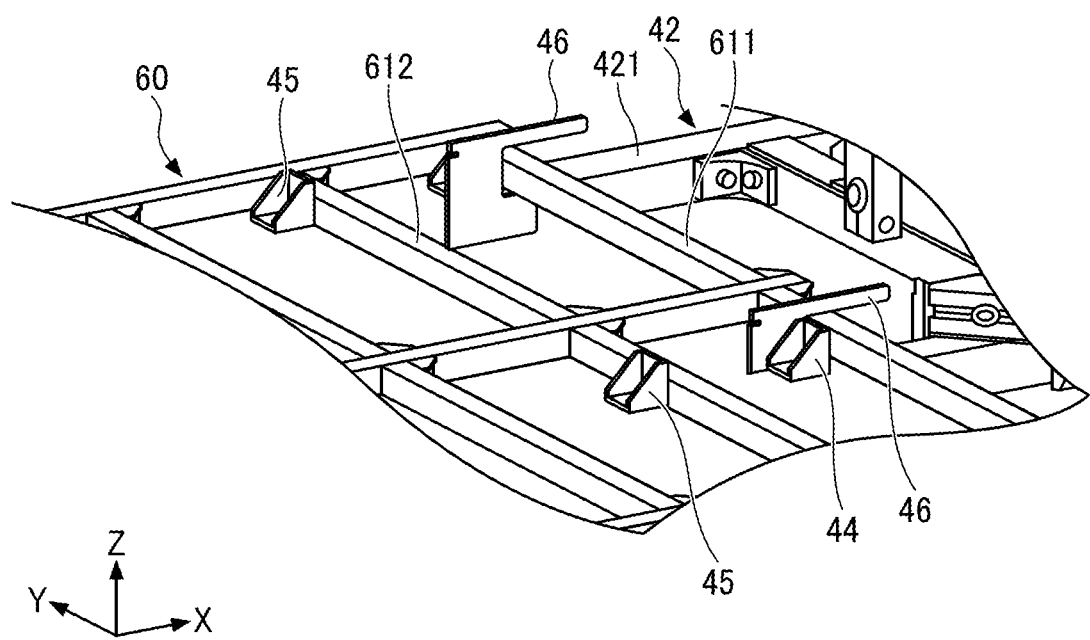
FIG. 11 is a magnified partial perspective view of an item fixture provided for a measuring apparatus, where one of a pair of handles is attached to the item fixture, according to an embodiment of the present disclosure.

FIG. 11 is a magnified partial perspective view of the item fixture 40 provided for the measuring apparatus 50, where one of the pair of handles 60 is attached to the item fixture 40, according to the present embodiment.

As illustrated in FIG. 7 and FIG. 8, the item fixture 40 or the measuring apparatus 50 according to the present embodiment is provided with the structure such as the pair of handle attachment portions 44 and 45 and the pair of rotation restraints 46, and the pair of handles 60 are attached to both sides of the item fixture 40 in the width direction parallel to the X-axis direction in a detachable manner. As illustrated in FIG. 7, the handle 60 according to the present embodiment can be detached from the item fixture 40 or the measuring apparatus 50. As illustrated in FIG. 8, the handle 60 can be attached to the item fixture 40 or the measuring apparatus 50.

The pair of handles 60 according to the present embodiment are used as handles or grips when the measuring apparatus 50 or the item fixture 40 is attached to the vehicle 20, and are attached to the measuring apparatus 50 in order to increase the installation processability. The pair of handles 60 are removed after the measurement apparatus 50 is attached to the attachment portion 22 (see, for example, FIG. 1) of the vehicle 20. In other words, when the vehicle 20 travels and the measurement is performed using the measurement apparatus 50, the pair of handle 60s are removed from the measurement apparatus 50 in advance.

As illustrated in FIG. 9, the handle 60 according to the present embodiment includes a first frame 61 that is formed in the horizontal direction parallel to the X-axis direction when the item fixture 40 is installed on the vehicle 20, and a second frame 62 that is formed in the vertical direction parallel to the Z-axis direction when the item fixture 40 is installed on the vehicle 20. The first frame 61 and the second frame 62 are orthogonal to each other to form an L shape. In other words, when the handle 60 is attached to the item fixture 40 or the measuring apparatus 50, one end of the first frame 61 is attached to the structure of the item fixture 40 or the measuring apparatus 50 to which handles are attached, and the other end of the first frame 61 is arranged outside in the width direction of the item fixture 40 or the measuring apparatus 50 parallel to the X-axis direction. One end of the second frame 62 is coupled to the other end of the first frame 61, and the other end of the second frame 62 is formed downward from the other end of the first frame 61.

The first frame 61 according to the present embodiment includes a pair of pillars 611 and 612 on one end that extend in the Y-axis direction orthogonal to the width direction parallel to the X-axis direction. The pair of pillars 611 and 612 according to the present embodiment serve as the first pillar and the second pillar, respectively, and are separated from each other in arrangements in the width direction parallel to the X-axis direction. The second frame 62 has a grip 621 at the other end. Moreover, the second frame 62 has a bracket 622 used when a box with the pair of handles 60 are formed.

Preferably, the pillar 611 that is arranged at one end of one of the pair of handles 60 and the grip 621 that is arranged at the other end of one of the pair of handles 60 are colored in different colors. Due to such a configuration, a side of each one of the pair of handles 60 to be attached to the structure to which one of the pair of handles is attached can easily be distinguished.

As illustrated in FIG. 10, the item fixture 40 according to the present embodiment is provided with a pair of handle attachment portions 44, a pair of handle attachment portions 45, and a pair of rotation restraints 46. The pair of handle attachment portions 44 according to the present embodiment that serve as the first handle attachment portion are arranged upright on the top side of the frame 421 and has a mounting face to which the pillar 611 is attached. Such a mounting face of each one of the pair of handle attachment portions 44 is formed at the inner portion in the width direction or X-axis direction. The pair of handle attachment portions 45 according to the present embodiment that serve as the second handle attachment portion are arranged at outer portions than the pair of handle attachment portions 44 in the width direction parallel to the X-axis direction, and are arranged upright on the top face of the frame 421. Moreover, each one of the pair of handle attachment portions 45 has a mounting face to which the pillar 612 is attached at the inner portion in the width direction or X-axis direction. Each one of the pair of rotation restraints 46 according to the present embodiment has a rotation-restricting face 46a that faces the top face of the frame 421. Each one of the pair of rotation restraints 46 has an opening on the inner side in the width direction and X-axis direction, and a mounting face for each one of the pair of handle attachment portions 44 according to the present embodiment that serve as the first handle attachment portion is arranged outside in the width direction parallel to the X-axis direction. The pair of handle attachment portions 44, the multiple handle attachment portions 45, and the pair of rotation restraints 46 are arranged for one of the pair of handles 60 in the forward and backward direction parallel to the Y-axis direction.

As illustrated in FIG. 11, when one of the pair of handles 60 are attached to the item fixture 40, the pillar 611 is fixed to the pair of handle attachment portions 44 using a plurality of fixation members such as bolts, and the pillar 612 is fixed to the pair of handle attachment portions 45 using a plurality of fixation members such as bolts.

A method of attaching the pair of handles 60 to the item fixture 40 of the measuring apparatus 50 is described below with reference to FIG. 12A, FIG. 12B, and FIG. 12C.

Figure 12A:
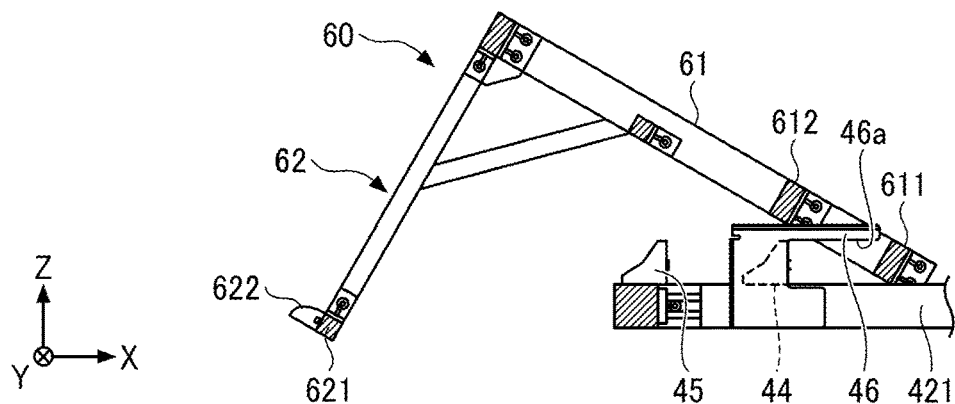
FIG. 12A, FIG. 12B, and FIG. 12C are sectional views of an item fixture of a measuring apparatus, illustrating a method of attaching a pair of handles to the item fixture, according to an embodiment of the present disclosure.
Figure 12B:
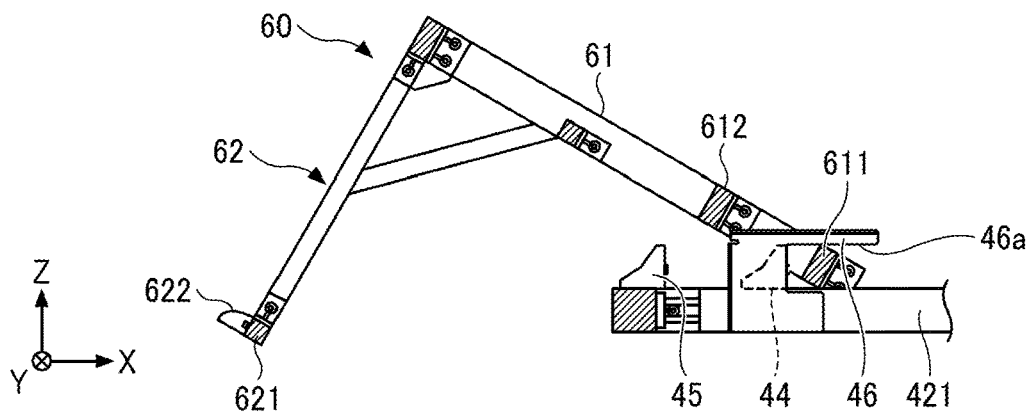
Figure 12C:
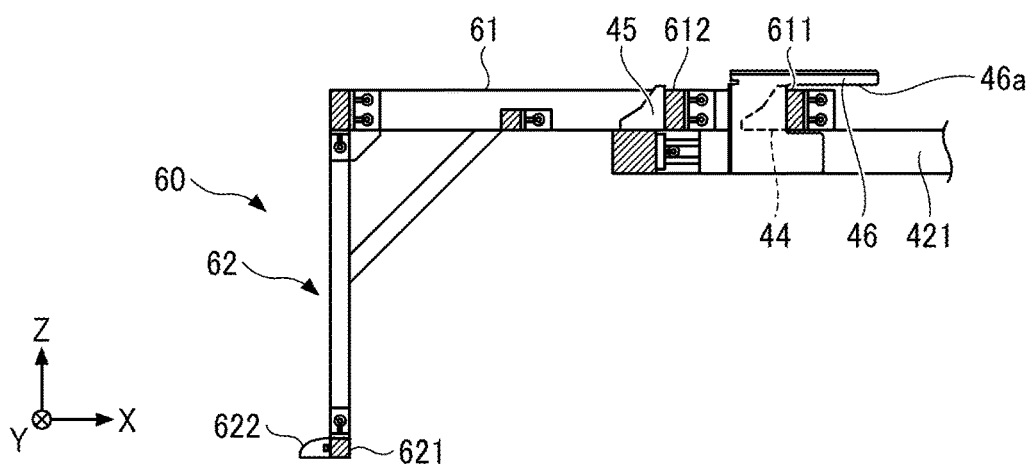

FIG. 12A, FIG. 12B, and FIG. 12C are sectional views of the item fixture 40 of the measuring apparatus 50, illustrating a method of attaching the pair of handles 60 to the item fixture 40, according to the present embodiment.

Firstly, the grip 621 of one of the pair of handles 60 is held by hand to lift up the handle 60. Secondly, each one of the pair of handles 60 is rotated around the grip 621 by its own weight. As a result, the pillar 611 of the handle 60 contacts the frame 421 of the item fixture 40 (see, for example, FIG. 12A).

Then, the pair of handles 60 are moved outward in the width direction of the vehicle 20 parallel to the X-axis direction. As a result, the pillar 611 is moved under the pair of rotation-restricting faces 46a of the pair of rotation restraints 46 (see, for example, FIG. 12B).

Subsequently, the grips 621 of the pair of handles 60 are lowered such that the pillar 612 of each one of the pair of handles 60 contacts the frame 421 of the item fixture 40. In the present embodiment, the rotation-restricting face 46a of the rotation restraint 46 restricts the pillar 611 from moving upward direction in the Z-axis direction. Due to such a configuration, even if the hands are released from the grip 621, the movement of the pillar 611 in the upward direction parallel to the Z-axis direction is restricted by the pair of rotation-restricting faces 46a. Due to such a configuration, the pair of handles 60 are prevented from dropping from the item fixture 40.

Then, the pair of handles 60 are moved outward in the width direction of the vehicle 20 parallel to the X-axis direction. As a result, the pillar 611 contacts the pair of handle attachment portions 44 and the pillar 612 contacts the pair of handle attachment portions 45. Accordingly, the relative positions of the pair of handles 60 are determined (see, for example, FIG. 12C).

Finally, the pillar 611 is fixed to the pair of handle attachment portions 44 using a plurality of fixation members such as bolts, and the pillar 612 is fixed to the pair of handle attachment portions 45 using a plurality of fixation members such as bolts. As a result, the pair of handles 60 are attached to the item fixture 40.

The other one of the pair of handles 60 on the other side is attached to the item fixture 40 in a similar manner to the above.

The pair of handles 60 that are attached to the item fixture 40 can be detached in the reverse order to when the pair of handles 60 are attached to the item fixture 40. For this reason, the description of detachment operation is omitted.

A method of attaching a measuring apparatus 50A to the vehicle 20 according to a control sample is described below.

Figure 13A:
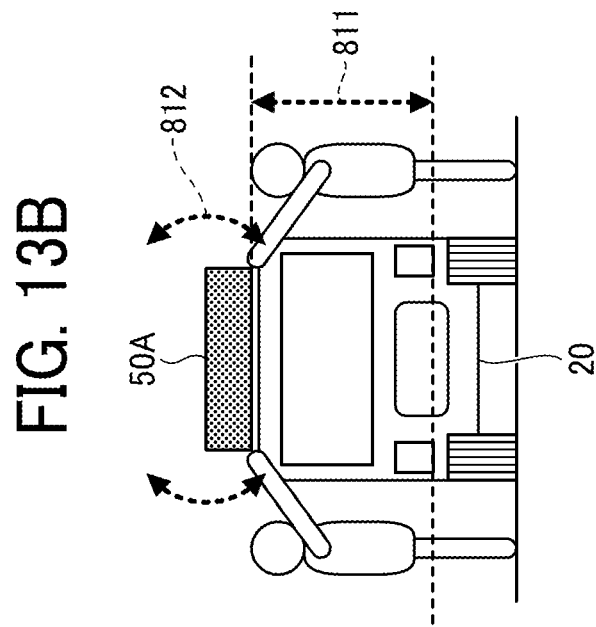
FIG. 13A and FIG. 13B are diagrams each illustrating a method of attaching a measurement apparatus to a vehicle, according to a control sample.
Figure 13B:
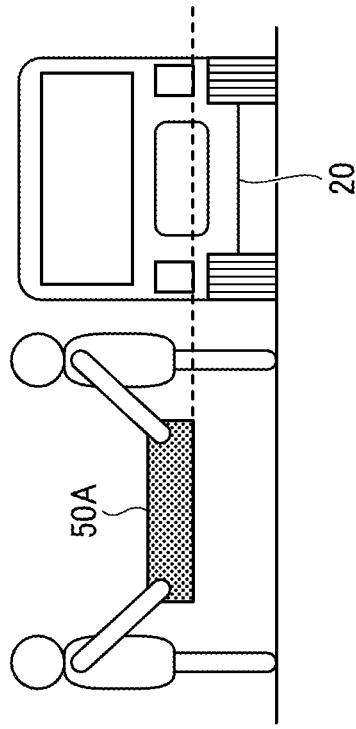

FIG. 13A and FIG. 13B are diagrams each illustrating a method of attaching the measurement apparatus 50A to the vehicle 20, according to the present control sample.

As illustrated in FIG. 13A and FIG. 13B, the measuring apparatus 50A that is a heavy piece of equipment is carried by two operators. More specifically, the measurement apparatus 50A is lifted and moved in the height direction above the vehicle 20 as indicated by a reference sign 811, and is supported such that the swinging of the measuring apparatus 50A, as indicated by a reference sign 812, will be controlled. For this reason, the load on the operator increases.

Figure 14:
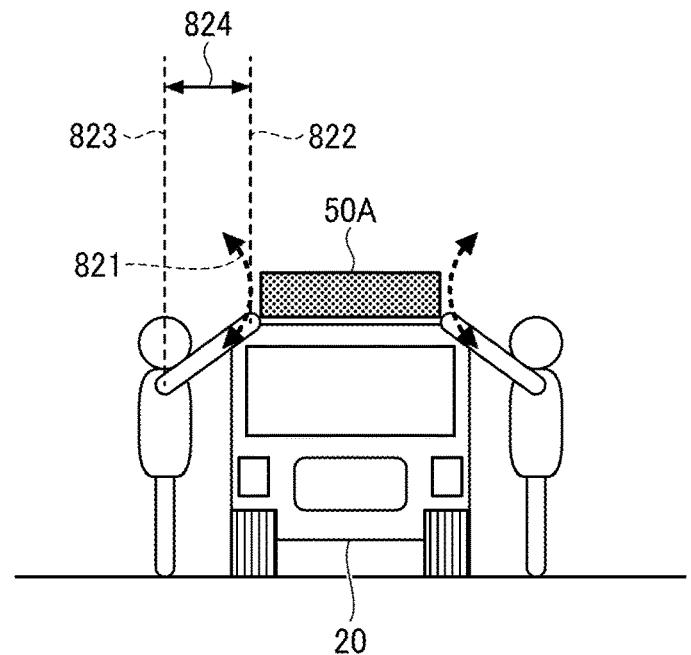
FIG. 14 is a diagram illustrating a method of attaching a measurement apparatus to a vehicle, according to a control sample.

FIG. 14 is a diagram illustrating a method of attaching the measurement apparatus 50A to the vehicle 20, according to the present control sample.

The measuring apparatus 50A is formed such that its width becomes narrower than the width of the vehicle 20. Due to such a configuration, the measuring apparatus 50A is mounted on the vehicle 20 so as not to jump out in the vehicle width direction of the vehicle 20. Accordingly, the operator has to stretch his/her hands over the roof of the vehicle 20 to support the measuring apparatus 50A at a position inside the vehicle width, and the distance 824 between the point of application 822 at which the measuring apparatus 50A is supported and the fixed point 823 of the operator himself/herself tends to increase. As the distance 824 increases, the moment of rotation, which is indicated by a reference sign 821, around the fixed point 823 such as a shoulder of the operator increases. For this reason, the load on the operator increases.

Figure 15:
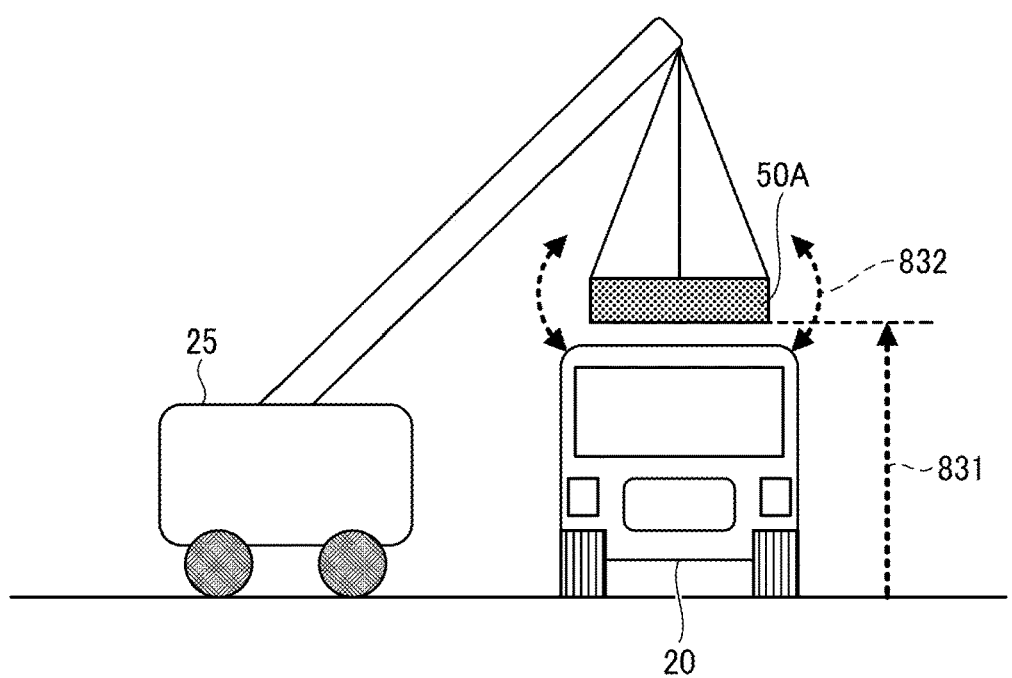
FIG. 15 is another diagram illustrating a method of attaching a measurement apparatus to a vehicle, according to a control sample.

FIG. 15 is another diagram illustrating a method of attaching the measurement apparatus 50A to the vehicle 20, according to the present control sample.

As illustrated in FIG. 15, a dedicated or specialized machine or structure such as a crane 25 may be used to lift the measuring apparatus 50A that is a heavy object. Due to such a configuration, the measurement apparatus 50A can be lifted and moved in the height direction above the vehicle 20 as indicated by a reference sign 831, and swinging of the measuring apparatus 50A, as indicated by a reference sign 832, can be controlled. By so doing, the measuring apparatus 50A can be lifted with stability. However, there is a technical problem in such a configuration or structure. For example, as the space for the usage of the crane 25 is required, the storage room for the crane 25 is required.

Figure 16B:
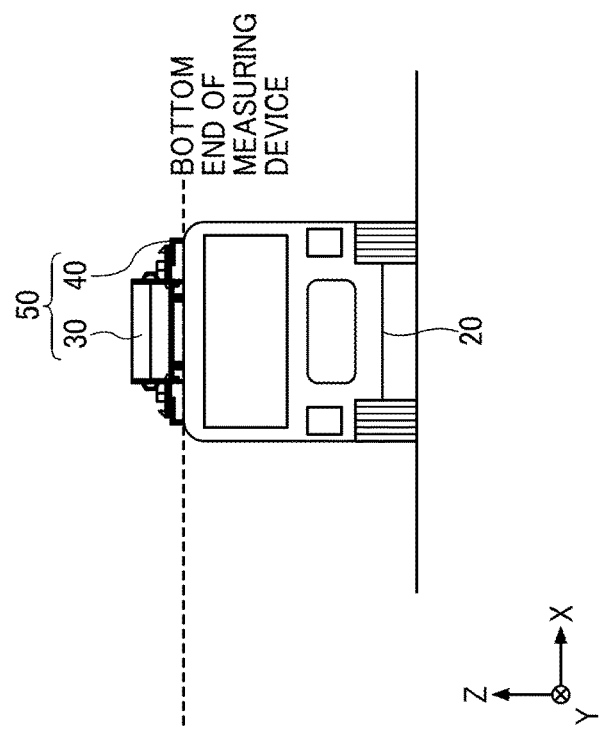
FIG. 16A and FIG. 16B are diagrams each illustrating a method of attaching a measurement apparatus to a vehicle, according to an embodiment of the present disclosure.
Figure 16A:
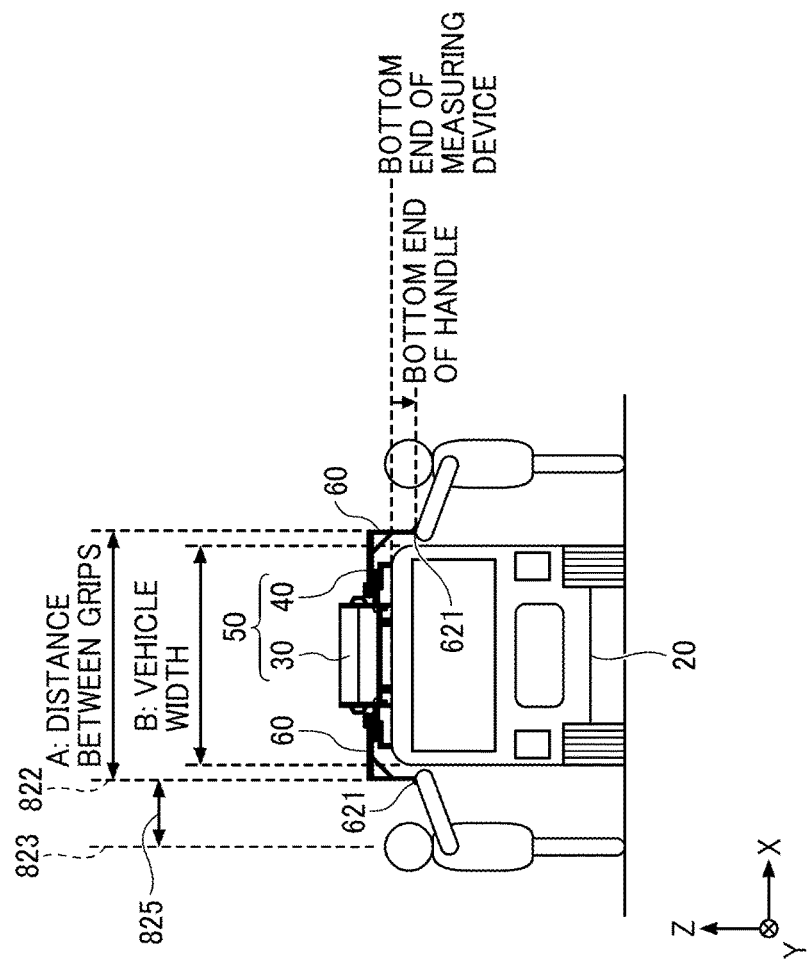

FIG. 16A and FIG. 16B are diagrams each illustrating a method of attaching the measuring apparatus 50 to the vehicle 20, according to the present embodiment.

Firstly, the pair of handles 60 are attached to the measuring apparatus 50 or the item fixture 40. Subsequently, the measuring apparatus 50 or the item fixture 40 is lifted above the vehicle 20 using the pair of handles 60 as a pair of handles or grips of the measuring apparatus 50 or the item fixture 40, and the measuring apparatus 50 or the item fixture 40 is attached to the attachment portion 22.

FIG. 16A illustrates the operation of attaching the measuring apparatus 50.

When the pair of L-shaped handles 60 are attached to both ends of the measurement apparatus 50 in the width direction parallel to the X-axis direction, the distance A between the pair of grips 621 becomes longer than the vehicle width B. In other words, the pair of grips 621 are arranged beyond both sides of the vehicle 20 in the width direction parallel to the X-axis direction. Due to such a configuration, the operator can support the measuring apparatus 50 without reaching the top of the roof of the vehicle 20 with his/her hand. As a result, the distance 825 between a point of application 822 at which the measuring apparatus 50 is supported and a fixed point 823 of the operator himself/herself can be reduced. As a result, the moment of rotation around the fixed point 823 such as a shoulder of the operator can be reduced. Accordingly, the load on the operator can be reduced.

The grip 621 that is arranged at the bottom end of the handle 60 is arranged at a position lower than the bottom end of the measuring apparatus 50. Due to such a configuration, the position at which the operator supports the pair of grips 621 can be lowered compared with the measurement apparatus 50A illustrated in FIG. 13A, FIG. 13B, and FIG. 14, and the amount of movement when the measurement apparatus 50 is lifted in the height direction parallel to the Z-axis direction above the vehicle 20 can be reduced. As a result, the load on the operator can be reduced.

The pair of handles 60 are detached from the measuring apparatus 50 or the item fixture 40. By so doing, the measuring apparatus 50 or the item fixture 40 can successfully be attached to the vehicle 20.

FIG. 16B illustrates a state in which measurement is performed using the measurement apparatus 50.

The measuring apparatus 50 is mounted on the vehicle 20 so as not to jump out in the vehicle width direction of the vehicle 20 parallel to the X-axis direction when the pair of handles 60 are detached.

FIG. 17 is a perspective view of the measuring device 30, the item fixture 40, and the pair of handles 60 that are detached from the vehicle 20, according to the present embodiment.

Figure 18:
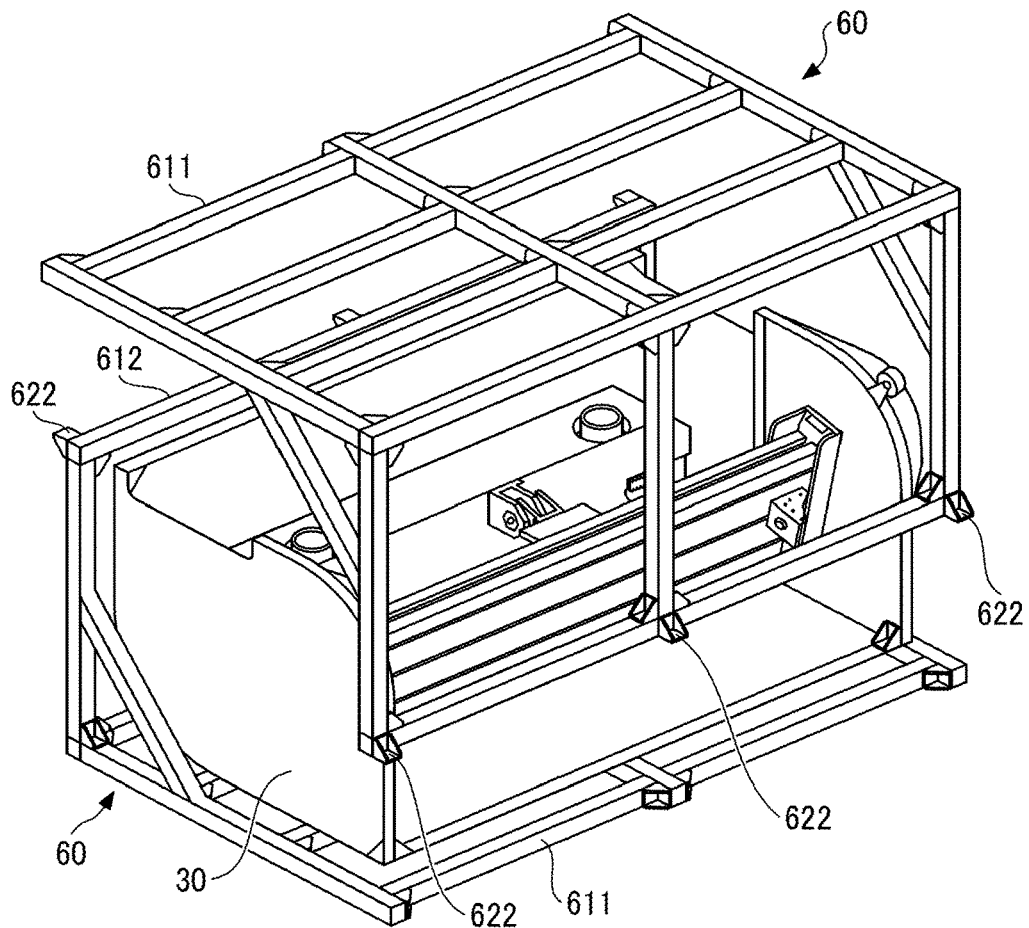
FIG. 18 is a perspective view of a measuring device and a pair of handles, where the measuring device is packed by the pair of handles, according to an embodiment of the present disclosure.

FIG. 18 is a perspective view of the measuring device 30 and the pair of handles 60, where the measuring device 30 is packed by the pair of handles 60, according to the present embodiment.

Figure 19:
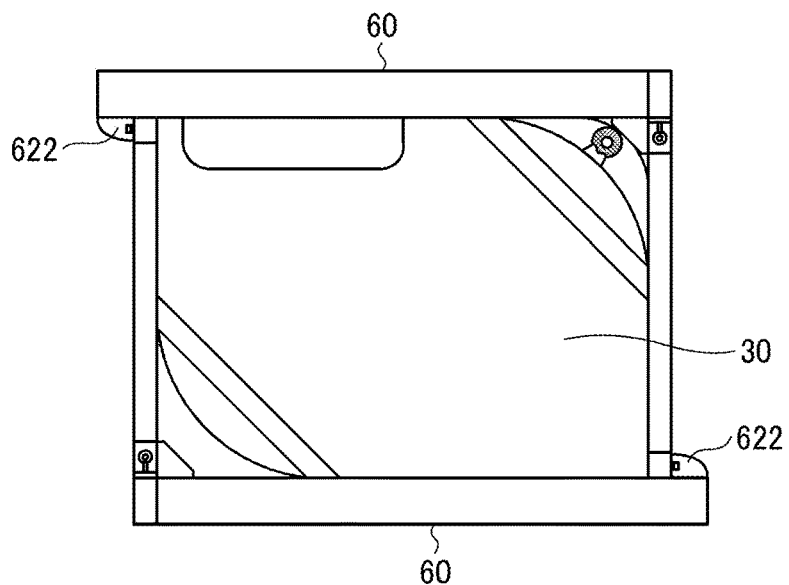
FIG. 19 is a side view of a measuring device and a pair of handles, where the measuring device is packed by the pair of handles, according to an embodiment of the present disclosure.

FIG. 19 is a side view of the measuring device 30 and the pair of handles 60, where the measuring device 30 is packed by the pair of handles 60, according to the present embodiment.

In the present embodiment, the measuring device 30 and the item fixture 40 that together configure the measuring apparatus 50 as well as the pair of handles 60 that are used to attach the measuring apparatus 50 are to be conveyed prior to the attachment to the vehicle 20, In so doing, the measuring device 30 that includes the stereo camera 31, which is precision equipment that performs measurement with a high degree of precision, is to be protected from external shock such as damage to the measuring apparatus due to the impact of drop.

In the present embodiment, each one of the pair of handles 60 is formed to have the same width, depth, and height. Accordingly, as illustrated in FIG. 18 and FIG. 19, the pair of handles 60 are combined together, and the bracket 622 of one of the pair of handles 60 is fixed to the other one of the pair of handles 60 using, for example, a bolt. As a result, a lattice-like box that covers twelve sides is formed, and the measuring device 30 is accommodated inside the box. Accordingly, the outer regions of the measuring device 30 are covered with the box of the pair of handles 60, and the stereo camera 31 can be protected.

For example, the mobile measuring apparatus 10 according to embodiments of the present disclosure is described above with reference to the drawings. However, the above-described embodiments are illustrative and do not limit the present disclosure. Thus, numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of the present disclosure.

In the above embodiments of the present disclosure, the item fixture 40 according to the present embodiment is used to attach the measuring device 30 or the stereo camera 31 to the vehicle 20. However, no limitation is indicated thereby, and the above embodiments of the present disclosure may be applied to an item fixture that is used to attach other kinds of items to the vehicle 20.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An item fixture comprising:
   a fixation member to be attached to an attachment portion of a vehicle; and
   a handle attachment portion to which a handle used to attach the item fixture to the vehicle is to be detachably attached,
   wherein the fixation member has a width direction parallel to a width direction of the vehicle when the item fixture is attached to the vehicle,
   wherein the handle attachment portion includes
      a first handle attachment portion and
      a second handle attachment portion disposed at an outer portion of the fixation member in the width direction of the fixation member than the first handle attachment portion, and wherein the handle includes
a first pillar to be attached to the first handle attachment portion,
a second pillar to be attached to the second handle attachment portion, and
a grip to be held by an operator.

2. The item fixture according to claim 1, further comprising
a rotation restraint having a rotation-restricting face,
wherein the rotation-restricting face faces a top face of the fixation member.

3. The item fixture according to claim 2,
wherein the rotation restraint has an inward opening in the width direction of the fixation member and a mounting face for the first handle attachment portion at an outer portion of the fixation member in the width direction of the fixation member than the inward opening.

4. The item fixture according to claim 1,
wherein the grip is disposed outside the item fixture in the width direction of the fixing member, and
wherein the grip is disposed lower than a bottom end of the item fixture.

5. The item fixture according to claim 1,
wherein the grip is colored with a color different from a color of the first pillar.

6. A mobile measuring apparatus comprising:
a vehicle;
an item fixture attached to the vehicle; and
a measuring device attached to the item fixture,
wherein the item fixture includes
a fixation member attached to an attachment portion of the vehicle, and
a handle attachment portion to which a handle used to attach the item fixture to the vehicle is detachably attached,
wherein the fixation member has a width direction parallel to a width direction of the vehicle when the item fixture is attached to the vehicle,
wherein the handle attachment portion includes
a first handle attachment portion and
a second handle attachment portion disposed at an outer portion of the fixation member in the width direction of the fixation member than the first handle attachment portion, and
wherein the handle includes
a first pillar to be attached to the first handle attachment portion,
a second pillar to be attached to the second handle attachment portion, and
a grip to be held by an operator.

7. The mobile measuring apparatus according to claim 6,
wherein the measuring device comprises:
an imaging device;
an imaging-device holding part; and
a protector detachably attached to the imaging-device holding part and configured to protect the imaging device from disturbance light.

8. The mobile measuring apparatus according to claim 7,
wherein the imaging device is a stereo camera.

* * * * *